July 10, 1945.  H. G. LYKKEN ET AL  2,380,321

PULVERIZING AND CLASSIFYING APPARATUS

Filed Oct. 3, 1941  5 Sheets-Sheet 1

INVENTORS
HENRY G. LYKKEN
WILLIAM H. LYKKEN
BY
ATTORNEY

July 10, 1945.  H. G. LYKKEN ET AL  2,380,321
PULVERIZING AND CLASSIFYING APPARATUS
Filed Oct. 3, 1941  5 Sheets-Sheet 2

INVENTORS
HENRY G. LYKKEN
WILLIAM H. LYKKEN
BY M. Theodore Simmons
ATTORNEY

July 10, 1945.  H. G. LYKKEN ET AL  2,380,321
PULVERIZING AND CLASSIFYING APPARATUS
Filed Oct. 3, 1941   5 Sheets-Sheet 3
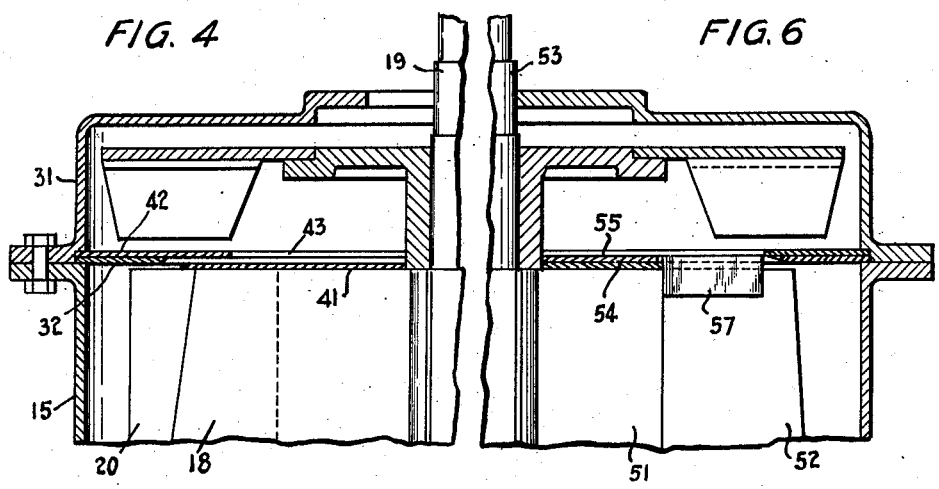
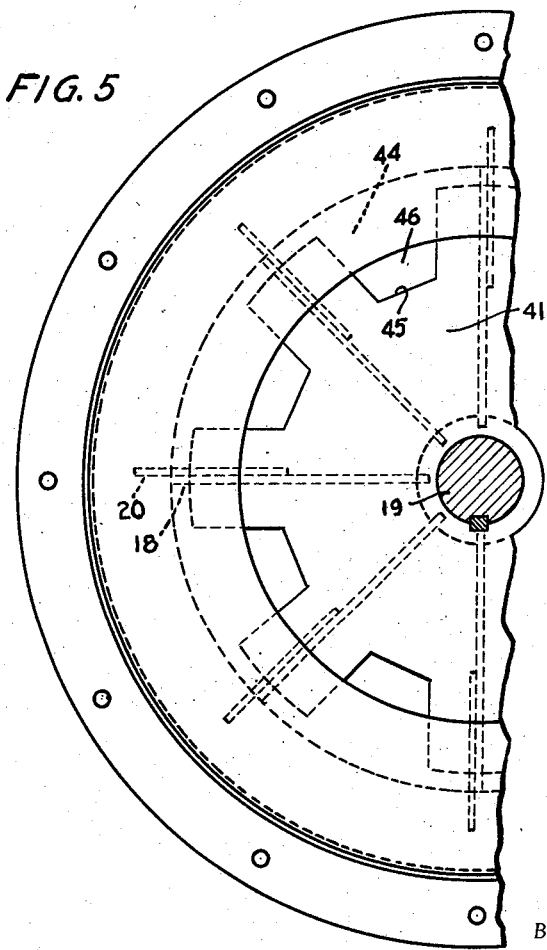
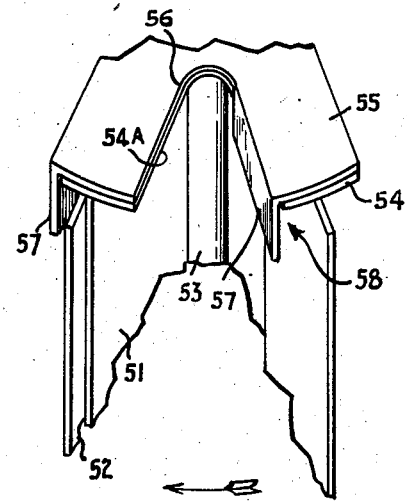
INVENTORS
HENRY G. LYKKEN
WILLIAM H. LYKKEN
BY
ATTORNEY

INVENTORS
HENRY G. LYKKEN
WILLIAM H. LYKKEN
BY
ATTORNEY

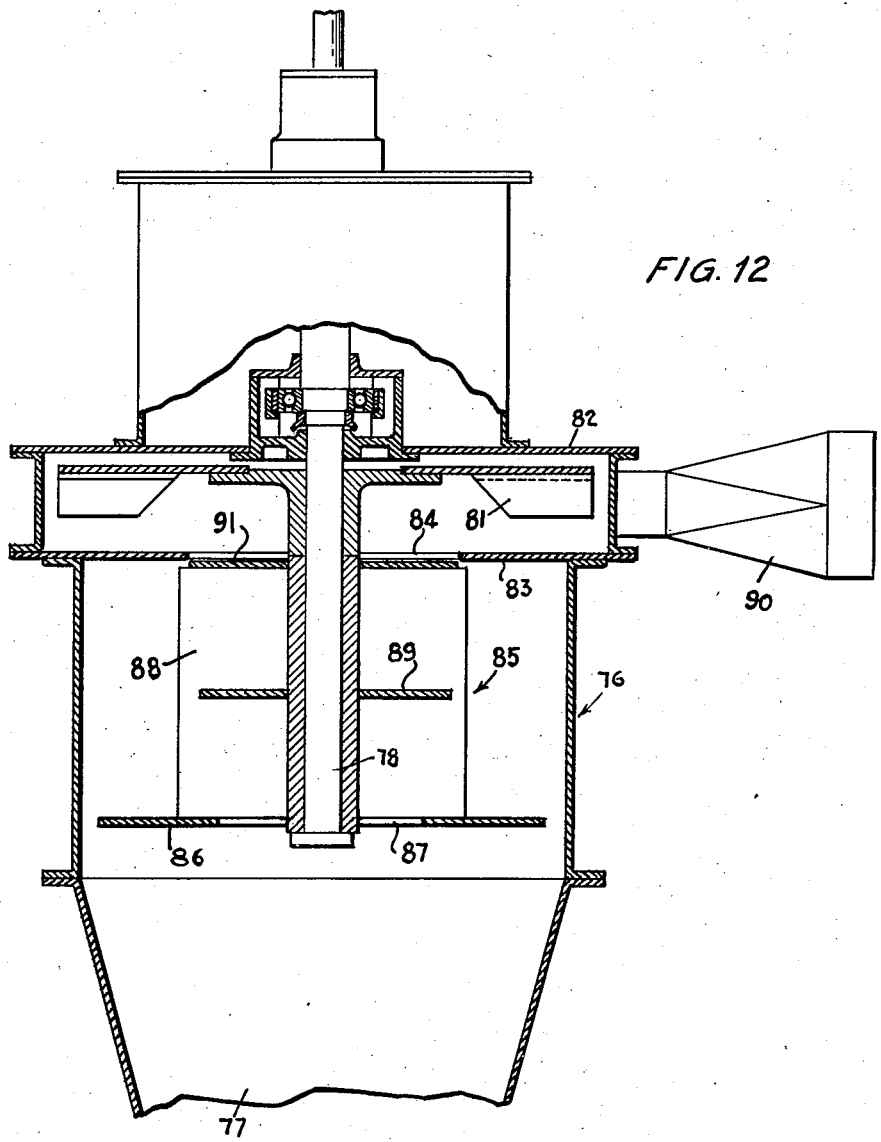

Patented July 10, 1945

2,380,321

UNITED STATES PATENT OFFICE 2,380,321

PULVERIZING AND CLASSIFYING APPARATUS

Henry G. Lykken and William H. Lykken, Minneapolis, Minn.

Application October 3, 1941, Serial No. 413,438

10 Claims. (Cl. 241—39)

Our invention relates to mechanisms for pulverizing and classifying friable materials.

In our co-pending application, Serial No. 367,314, filed November 27, 1940, there is disclosed a pulverizing and classifying machine in which there is an element creating a vortex of air or other gaseous medium in which the particles of material being pulverized are suspended. Pulverization of the material occurs in the lower portion of the chamber and a classification of the pulverized material to select or limit the maximum particle size delivered from the machine takes place in the upper portion of the chamber, but in the same vortex. In the embodiment shown in that application a vertically mounted rotor having radial blades produces the vortex, the pulverization occurring about the lower end of the rotor and the classification occurring at the upper end of the rotor. The opposite ends of the rotor are closed by discs but a variable annular outlet is provided in the upper disc, leading into a fan chamber from which the finished material is delivered out of the machine. The same principle of classification control is shown applied to a separate classifier with a rotor adjacent its outlet.

In the commercial use of that apparatus it sometimes happens that oversize particles escape through the annular outlet, and oftentimes that is undesirable.

In that apparatus the upper rotor disc causes a radial flow of the air and suspended material outwardly from the hub of the rotor. It has been discovered that adjacent to the advancing faces of the rotor blades particularly, and to some degree adjacent the trailing faces of the blades, a resistance is developed due to the friction of the air, or the "skin-core" effect, in these areas. This friction will tend to slow down and even stop the radial movement of the material particles, whereupon the upward movement of the air toward the outlet will lift these particles axially of the rotor. When this friction occurs near the tops of the rotor blades, the material will be carried through the annular opening before any oversize particles therein could be ejected radially from the rotor.

In other words, in grinding various materials we would get a finished product having a very uniform particle size and the mesh thereof could be well regulated in one of the several manners described in that application but, from time to time, a few oversize particles that seem to hold no relationship to the bulk of the material were accidentally delivered from the machine with the finished material. We determined that they escaped as described above, for the most part along the leading faces of the rotor blades, and, to a minor degree, along the trailing faces thereof.

Again, with some materials, and with others especially when pulverizing to sizes of a few microns, there appeared to be an excessive recirculation of the material between the top and bottom of the rotor chamber as the oversize was rejected and fell by gravity to the lower part of the chamber for re-pulverization; while increasing the height or size of the rotor did not provide the increase in capacity normally to be expected therefrom. We determined that an excess of insufficiently pulverized material reaching the upper or rotary disc was also interfering with the efficiency of the classification.

It is one object of our invention to provide apparatus in which friable materials may be pulverized to a selected particle size and in which material of that size can be delivered from the apparatus free of oversize particles.

It is still another object of our invention to provide a classifier for pulverized materials having an axial outlet for the desired material wherein the radial flow of material across that outlet is increased so as to insure ejection of oversize particles.

It is a further object of our invention to provide an apertured rotary disc across the outlet from a chamber in which classification of pulverized material takes place.

It is a still further object of our invention to provide the ends of the blades of a classifying rotor for pulverized materials with either flat or channel shaped coverings to prevent the escape of oversize material through one or more openings in the end of the rotor.

It is an even further object of our invention to provide a closure plate or rotor blade covering as referred to in the two immediately preceding paragraphs adjustable to vary the sizes of openings therein or the covering.

It is an even further object of our invention to provide a construction of apparatus wherein the discs defining the outlet openings may be replaced to vary the radial position or the size thereof or to effect other adjustments of the discs so that the same apparatus may be used with a wide variety of materials and also a wide variety of particle sizes to be classified and delivered from the apparatus.

Other and further objects and advantages of our invention will be apparent from this specification taken in conjunction with the accompanying drawings, wherein—

Fig. 4 is a fragmentary view in enlarged detail of a portion of the classifying and fan chambers showing a modification;

Fig. 5 is a fragmentary view, in section similar to Fig. 3, of the modification shown in Fig. 4;

Fig. 6 is a fragmentary view in enlarged detail of the classifying and fan chambers showing another modification;

Fig. 7 is a fragmentary view in perspective of the upper portion of the classifying rotor with the modification shown in Fig. 6;

Fig. 12 is a vertical section of a separate classifier for attachment to any pulverizing apparatus and illustrating an embodiment of our present invention therein.

Figure 1:
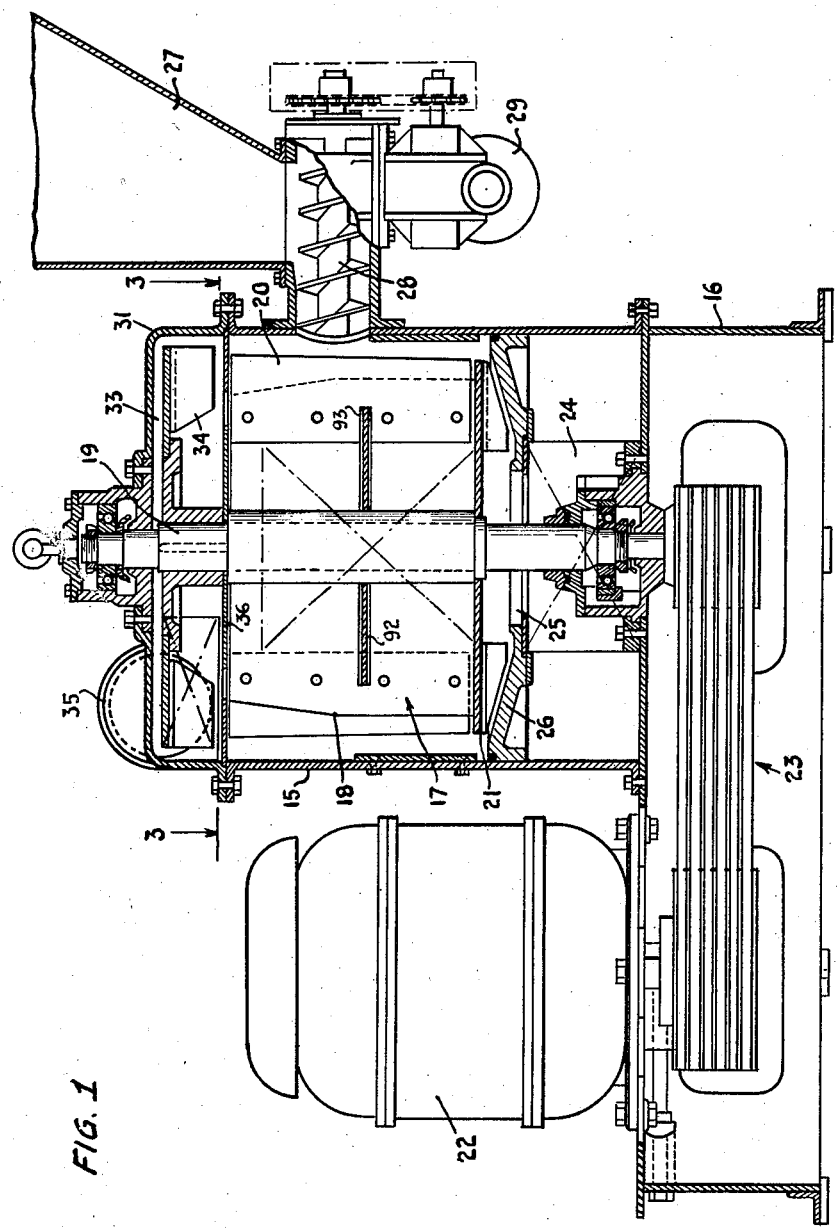
Figure 1 is a vertical section of a pulverizing and classifying machine according to our invention.
Figure 2:
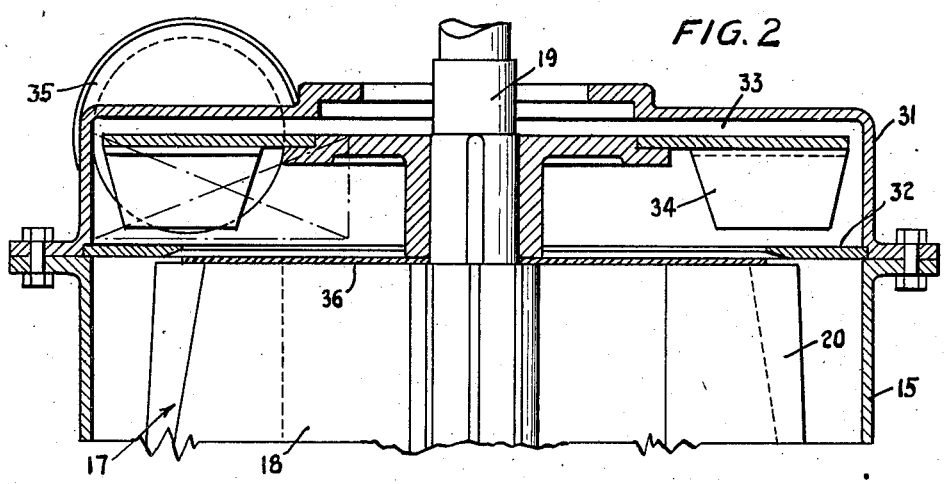
Fig. 2 is a fragmentary view, also in vertical section, and in enlarged detail showing the upper end of the classifying rotor and the fan chamber of Fig. 1.
Figure 3:
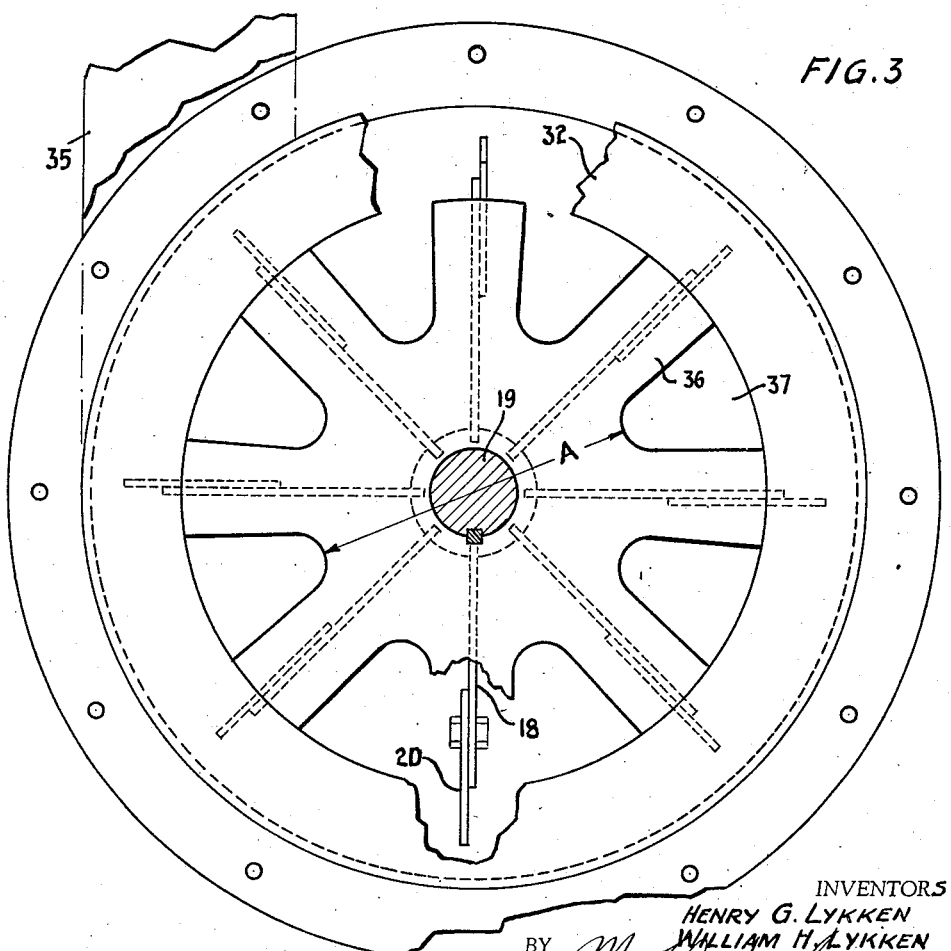
Fig. 3 is a horizontal section on the line 3—3 of Fig. 1, parts being broken away to facilitate illustration.
Figure 8:
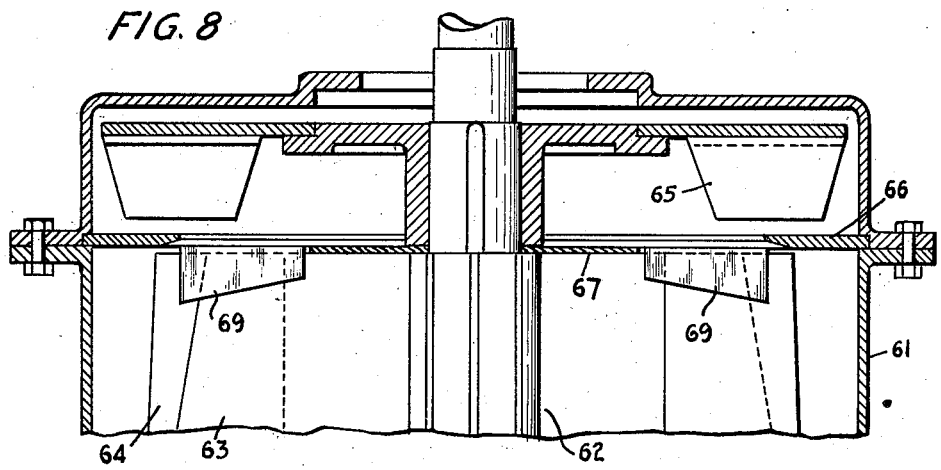
Fig. 8 is a view similar to Fig. 2 showing a further modification.
Figure 9:
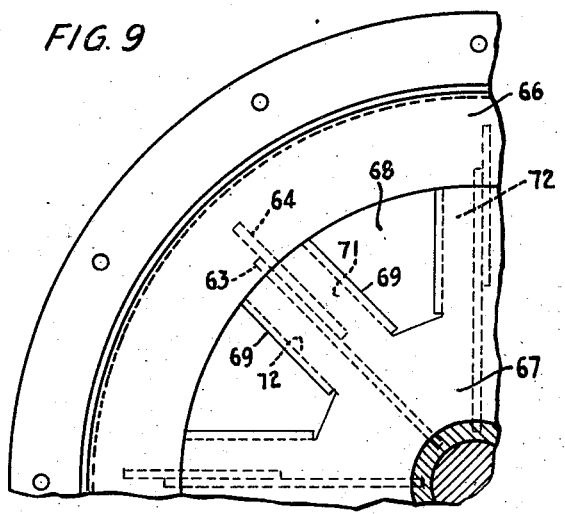
Fig. 9 is a fragmentary view, similar to Fig. 3, further illustrating the modification of Fig. 8.

Referring to Figs. 1, 2 and 3, the pulverizing and classifying machine comprises a casing 15 mounted upon a base 16 and having therein a rotor 17 of less diameter than the casing. The rotor comprises a plurality of radial blades 18 extending outwardly from a shaft 19 forming the hub of the rotor. Each blade has bolted thereto an extension plate 20, these plates being replaceable by other plates having the outer edge thereof tapered inwardly or outwardly from the vertical, shown in Fig. 1, the purpose of this tapering being to control to some extent the pulverization and particularly to control the classification or the particle size delivered by the apparatus. The rotor also has an imperforate bottom disc 21 below which air is admitted, the air entering the casing through an opening 24 in the side thereof and passing upwardly through a central opening 25 in the bottom disc 26 of the rotor chamber. The rotor is driven by a motor 22 mounted upon the base 16 through the belt and pulley drive indicated at 23. Material to be pulverized is fed into the chamber from a hopper 27 by means of the feed screw 28 which is driven by a separate motor 29, through suitable gearing.

Referring now to Figs. 2 and 3, the casing 15 is surmounted by a cover 31 bolted thereto as indicated. A ring shaped baffle 32 is supported between the cover and casing 15 where the same are bolted together, the baffle extending inwardly and partly overlies the rotor plates 20 in this illustration. This baffle divides the pulverizing and classifying chamber from the fan chamber 33 in which is mounted a fan 34 that is driven from the shaft 19. Material to be pulverized is fed to the casing 15, is picked up in the high speed annular vortex created by the rotor 17, and the particles are caused to effect many collisions, etc., with each other to reduce the same in particle size as they are whirled around in the vortex. The air with the suspended pulverized material is drawn upwardly in the rotor chamber by means of the fan 34, the sufficiently pulverized material being carried into the fan chamber and delivered through the outlet 35 to a collection apparatus (not shown) or to a place of use, as the case may be. The spacing and arrangement of the rotor blades may be such as to set up, in addition to the annular vortex, small, high speed intra-blade vortices to assist in the pulverization of the material. In the above respect, the apparatus is similar in construction and operation to that described in said application Serial No. 367,314.

As an additional control over the size of the particle delivered from the machine, and also for the purpose of preventing the escape of oversize particles into the fan chamber, a disc 36 is provided across the upper or outlet end of the rotor 17, to cooperate with the baffle 32 to define the outlet 35. Disc 36 is provided with a plurality of openings 37, in this case somewhat V-shaped, and which occur in between the blades 18 of the rotor. Both the shape and size of these openings may be varied according to the nature of the material being pulverized and to the fineness of the particle size being delivered from the machine, and some of these variations will be discussed later. The disc 36 may be mounted upon the shaft 19 to rotate therewith, or it may be secured in any suitable manner to the rotor. With the particular "star" shape shown in Fig. 3, each rotor blade is provided with a covering or roof which extends laterally on either side of the blade.

Accordingly, pulverized material will be drawn upwardly by the fan 34 through the openings 37 and the material in the center of the intra-blade space passes freely out of the pulverizing and classifying chamber. However, the disc 36 blocks the upward axial flow of air and material adjacent either face of each of the rotor blades and at the center of the rotor and directs the same radially outward. The result is that turbulence in the air adjacent the outlet openings is eliminated, and any intra-blade vortices are moved outwardly and destroyed. The withdrawing power of the fan 34 is sufficient to lift through the openings 37 any material of the desired particle size or under, but any oversize material which tends to slow down adjacent the blade faces encounters the prongs of the disc 36 and its escape into the fan chamber 33 is blocked so that the radial centrifugal forces tending to eject material from between the rotor blades has an opportunity to act upon this oversize material before it reaches the outlet openings 37. Thus the oversize material is carried into the annular space outside the rotor 17 where it is free to fall by gravity into the lower portion of the rotor chamber for further pulverization.

Generally speaking, the solid central portion of the disc 36, indicated by the arrows "A" in Fig. 3, will be from one-half to two-thirds of the diameter of the rotor. Thus, the radial position of the outlet openings is varied and this is controlled somewhat by the size of the particle to be delivered from the machine. In the illustration in Figs. 2 and 3, the inner diameter of the opening defined by the baffle 32 coincides with the outer diameter of the disc 36, but this need not always be the case.

Figs. 4 and 5 illustrate an arrangement in which the size of this opening defined by the baffle is considerably reduced, and the shape of the openings in the disk 41, corresponding to the disk 36, are changed thereby. In this case, an additional ring-shaped disk 42 is superimposed upon the baffle 32 thus making the central opening 43 much smaller. Also in the illustration in these figures, the inner end of each of the cutaway portions 44 is flattened as indicated at 45 so as to leave slot-like openings 46 in between each of the rotor blades, when viewed from above.

It is obvious that any shape opening 46 may be used in the arrangement of Figs. 4 and 5, this showing being for the purpose of illustration only. However, in general, the arrangement of the overlying disk 42 will be used with the finer delivered particle sizes, while the arrangement shown in Figs. 1, 2 and 3 will be used when larger particle sizes are being collected. The particle sizes referred to here range above and below ten microns, while with still larger sizes, such as one hundred screen mesh, and above, the openings in the outlet disk 36 or 41 may be larger, deeper, and more V shaped.

Figs. 6 and 7 illustrate a further refinement found useful with certain materials, where there was discovered a tendency for over-size particles to creep around the edges of the openings in the upper disk and thus escape with the finished material. In this case the pulverizing and classifying rotor blades are indicated at 51, having plates 52 attached thereto and extending radially from a hub 53. The "star" shaped outlet disk 54 is here similar in construction and in position to the disk 36 of Figs. 2 and 3, having openings 54A between the blades, but in this case there is superimposed upon the disk 54 a second disk 55. The latter disk has openings 56 therein similar in shape to and registering with openings 54A, and extending downwardly from the disk in each opening 56 is a flange 57. Each flange thus becomes spaced from one face of each of the blades and forms with the blade a radial channel 58. These channels are located on the side of the advancing face of each blade, the rotor turning in the direction indicated by the arrow in Fig. 7. We may say that with some materials we have found that practically no roof extension is needed on the trailing face of the blade, and this is in general true with all the forms of outlet disks shown herein.

Figs. 6 and 7 also illustrate the upper disk 55 as not connected to be driven by the shaft 53, it being freely adjustable on the plate 54 to make the channel 58 wide or narrow as may be found will best suit the condition with the particular material being pulverized, and also the fineness of the particle size to be delivered. Adjusting the upper disk will of course vary the size of the openings 56. This same principle of superimposed disks shiftable laterally around the hub of the rotor to expand or contract the outlet openings can be used in any of the other arrangements shown, in Figs. 1 to 5 for example. We have found that it is not necessary to fasten together the superimposed disks, the friction therebetween being sufficient to maintain them in adjusted position, although, of course, means for fastening the disks together could readily be provided.

Figure 10:
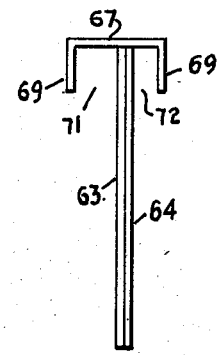
Fig. 10 is an enlarged detail showing the relationship of rotor blades and disc according to the modification of Fig. 8.
Figure 11:
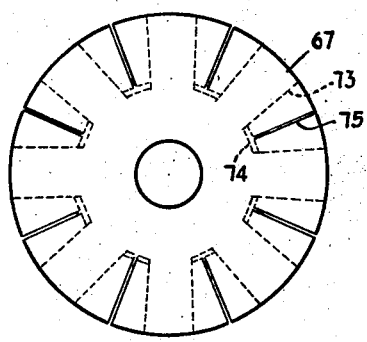
Fig. 11 is a diagrammatic view showing the development of the rotor disc of Fig. 8.

Figs. 8 to 11 illustrate a still further refinement in operation of the closure disk. The general construction of the apparatus remains the same, viz., casing 61, rotor 62 having radial blades 63 provided with plates 64, fan 65, and annular baffle 66. In this case, the rotor disk 67 has V-shaped openings 68 located between the rotor blades 63 and on each side of these openings there is a depending flange 69. Consequently, when the rotor disk is mounted in place, as shown in Fig. 10, flanges 69 are spaced from the rotor blades 63 and form therewith radial channels 71 and 72. Thus, any material rising adjacent either face of the several rotor blades is caught in these channels and carried out of the rotor beyond the outlet openings 68, with no possibility of the oversize particles creeping around the edges of the flanges into the outlet openings. The outlet disk 67 may be formed as indicated in Fig. 11 wherein the shape of the intra-blade openings are scored on the disk as indicated at 73. Then a small portion thereof is cut out as indicated at 74 adjacent the apex of the scored parts, after which a slit 75 is made midway between the scored sides and extending from the outer edge of the disk to the cutaway portion. Then the two halves between the slit and the adjacent scored portions are bent downwardly to form the depending flanges 69.

From our observations to date, the undesired over-sized material does not rise into the outlet opening along the axis of the rotor or in the center of the space between the rotor blades, so that it is sufficient to provide the covering, flanged or unflanged, at the sides of the openings along the rotor blades. However, the flanges 69 are substantially joined at the apex of the openings 68 and, if necessary, the same could be joined, in the construction of Figs. 8 to 11, or in any of the other constructions. Likewise, the flanges 69 of Fig. 10, or the flange of Fig. 7, can be separate from and suitably secured to the outlet disk and the depth thereof can be varied as may be required. Again, the disk 67 may be adjustable around the axis of the rotor, as explained above, producing a narrower channel on the trailing side of each blade than on the advancing side thereof in the rotation of the rotor. In this connection, the width of the covering over each blade may be varied between one-quarter and two or more inches on either side of the rotor blade.

Referring again to Fig. 1, the rotor may be divided by an intermediate disc 92 which extends outwardly from the hub of the rotor and is of a diameter about four-fifths the diameter of the bottom disc 21 of the rotor. The extension plates 20 of the rotor are appropriately notched as indicated at 93 to fit over the ends of the disc 92, and as are the rotor blades 18, or the disc may consist of a plurality of sections fitting between the rotor blades and welded thereto. This disc will serve to retain the material for a longer time near the bottom of the rotor, in the pulverization area, and will also interrupt the upward flow of the material axially of the rotor. In machines of little height a single intermediate disc may be sufficient.

Fig. 12 shows the application of the principles described above to a separate classifier arranged for attachment to any pulverizing apparatus, as for example, the type shown in patent to Henry G. Lykken, No. 1,838,560, issued December 29, 1931. The classifier is indicated generally at 76, the material to be classified entering at the bottom through the opening 77. The air and suspended material may have some centrifugal action imparted to it and it passes upwardly in the casing under the action of the discharge fan 81. A shaft 78 is mounted for rotation in the casing of the classifier and carries this fan. The fan chamber 82 is separated from the classifier chamber by means of the annular baffle 83 which provides the central outlet opening 84.

At the upper end of the casing adjacent this opening 84 the shaft 78 has secured thereto the hub of a rotor 85 having a bottom disc 86, in which is a central opening 87, and a plurality of radial blades 88. The air borne material being classified enters the opening 87 and is acted upon by the rotor to eject the oversize material to the sides of the casing where it falls to the bottom of the classifier. The rotor is provided with an intermediate disc 89 of greater diameter than that of the opening 87, which also assists in spreading the material. Mounted on top of the rotor and secured either to the rotor blades 88 or to the shaft 78 is a rotary outlet disc 91 which is vertically aligned with the opening 84. This disc 91 is shown as similar in construction to the star-shaped disc of Figs. 2 and 3 with the somewhat V-shaped openings occurring in the intrablade spaces and the wide prongs of the disc overlying each of the rotor blades. It is obvious, however, that any of the other disc arrangements shown may be substituted for this disc 91 in accordance with the principles outlined hereinbefore. The action of this classifier rotor will be described in the other embodiments, viz., the oversize material will be ejected radially beyond the rotor and fall by gravity to be returned for re-pulverization and the desired material will be drawn through the openings in the disc 91 past the baffle 83 and be discharged by means of the fan 81 through the outlet 90.

In all of the above illustrations we have assumed a rotor having eight blades, but the number of these blades will vary with the size of the apparatus, and to some extent with the nature of the material being acted upon. It will be understood that this will make corresponding changes in the number of prongs or arm extensions on the rotor or outlet disc. Again, these same results of protecting against the creeping of oversize material through the outlet openings in the area adjacent the blade faces may be secured by welding or otherwise securing such coverings to each rotor blade regardless of the shape of the outlet opening or openings.

From the foregoing it will be appreciated that the same pulverizing or classifying apparatus may be used with a wide variety of materials and of particle sizes thereof by simple interchange of outlet disc and baffle ring which can be readily replaced by removing the cover and fan whereupon either or both the baffle and rotor disc or discs can be lifted out and new ones inserted, the fan and cover then being re-bolted in place.

Other modifications may be made in the construction and arrangement of parts within the spirit and scope of our invention, and such are intended to be covered by the appended claims.

We claim:

1. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor mounted in the casing adjacent said opening, the rotor being provided with radial blades extending across said opening and having an open end adjacent the same, and a rotary disk partially covering said open end, said disk having a plurality of extensions thereon respectively covering the ends of the blades of said rotor and being adjustable so as to vary the relative positions of said extensions and rotor blades.

2. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor mounted in the casing adjacent said opening, the rotor being provided with radial blades extending across said opening and having an open end adjacent the same, and a plurality of rotary disks partially covering said open end, said disks having a plurality of registering openings therein located between the blades of said rotor and of less width than the space between said blades, said disks being adjustable with respect to each other to vary the effective sizes of the registering openings.

3. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor mounted in the casing so as to operate adjacent said opening, the rotor being provided with radial blades extending across said opening and having an open end adjacent the same, and a rotary disk mounted between the rotor and said opening and substantially covering the same, said disk having a plurality of openings therein located in the outer portion of the disk and being of less width than the intrablade spaces, the baffle overlying and overlapping the outer portion of the disk.

4. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor centrally mounted in the casing adjacent said opening, the rotor being provided with radial blades, and having an open end adjacent said baffle opening, and a rotary disk mounted between the rotor and said opening, said disk having a central portion and a plurality of extensions thereon respectively covering the blades of said rotor and providing spaces located between said blades, the baffle partially overlying and overlapping said extensions.

5. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, and a rotor mounted in the casing adjacent said opening, the rotor being provided with radial blades having a laterally extending covering on the end of each blade adjacent said opening, said coverings extending part way over the intra-blade spaces and having on each a depending flange forming with the adjacent blade a radial channel.

6. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, and a rotor mounted in the casing adjacent said opening, the rotor being provided with radial blades having a channel shaped laterally extending covering over the end of each blade adjacent said opening, said coverings extending part way over the intra-blade spaces, and the sides of each of said channel coverings depending to form with the adjacent blade a radial channel on each side thereof.

7. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor mounted in the casing adjacent said opening, the rotor being provided with radial blades and having an open end adjacent said baffle opening, and a rotary disk partially covering said open end, said disk having a plurality of extensions thereon respectively covering the ends of the blades of said rotor, each of said extensions having a depending flange forming with the adjacent blade a radial channel.

8. In a classifier for pulverized material suspended in a gaseous medium, a casing, a discharge outlet therefrom for selected material, a ring-shaped baffle mounted in the casing below the discharge outlet and providing a central opening, a fan for drawing air and selected material through said opening and said outlet, a rotor mounted in the casing adjacent said opening, the rotor being provided with radial blades and having an open end adjacent said baffle opening, and a pair of rotary disks partially covering said open end, said disks having a plurality of extensions thereon respectively covering the ends of the blades of said rotor and one of said disks having a depending flange on each of its extensions, the disks being adjustable to each other in the plane thereof.

9. In an apparatus for pulverizing and classifying friable material suspended in a gaseous medium, a casing, a discharge outlet therefrom for selected material, a ring-shaped baffle mounted in the casing below the discharge outlet and providing a central opening, a fan for drawing air and selected material through said opening and means for supplying air and material to said casing, a rotor mounted in and of less diameter than the casing, the rotor being provided with a bottom disk and radial blades extending upwardly therefrom to adjacent said opening and across the same, and a laterally extending covering for the end of each blade adjacent said opening, said coverings extending part way over the intra-blade spaces.

10. In apparatus for pulverizing and classifying friable material suspended in a gaseous medium, a casing, means for supplying a gaseous medium and material to said casing, a rotor mounted in and of less diameter than the casing and extending substantially from the top to the bottom thereof, the rotor being provided with a bottom disc and radial blades extending the full height of the rotor as well as an intermediate disc of less diameter than the bottom disc, said rotor producing a pulverizing vortex of the medium and suspended material in the space around the rotor, a central outlet opening adjacent the upper end of the rotor, means for withdrawing selected material therethrough, and a rotary disc mounted between the rotor and said opening and partially closing the opening, said latter disc having a plurality of openings therein through which selected material passes to said outlet opening.

HENRY G. LYKKEN.
WILLIAM H. LYKKEN.